ZENAS CRANE WARREN, OF BROOKLYN, NEW YORK, ASSIGNOR TO HENRY C. HULBERT, OF SAME PLACE.

Letters Patent No. 88,102, dated March 23, 1869.

IMPROVEMENT IN THE MANUFACTURE OF PAPER.

The Schedule referred to in these Letters Patent and making part of the same.

*To all whom it may concern:*

Be it known that I, ZENAS CRANE WARREN, of Brooklyn, in the State of New York, have invented certain new and useful Improvements in the Manufacture of Paper; and that the following is a full, clear, and exact description and specification of my said invention.

Previous to my invention, it had been customary to size fine papers with animal size, prepared either from glue, or from scraps of raw hide and similar articles.

The expense of such sizing is a material part of the cost of manufacturing paper, and the effect of such size upon the paper is to cause it to contract materially in the subsequent operation of drying.

The object of my invention is to reduce the expense of sizing the paper, and also to lessen the contraction in drying after sizing. To this end, The first part of my invention consists of a composite sizing, containing sago (or equivalent starch-material) and nitric acid, as component parts, with or without animal glue.

The second part of my invention consists of the combination of the said composite sizing with paper, the combination, when formed, constituting a new article of sized paper.

In order that my invention may be fully understood, I will proceed to describe the mode in which I have practised it with success.

To prepare a composite sizing, suitable for sizing fine writing-papers, I make use of the following materials in the following proportions, viz:

Sago-flour, seven hundred pounds.
Glue, three hundred pounds.
Nitric acid, (commercial,) fifteen pounds.
Aqua ammonia, (commercial,) ten pounds.
Carbolic acid, (crystallized,) three ounces.

I soak the glue in cold water, and then pour off the excess of water which has not been absorbed by the glue. I stir the nitric acid into fourteen hundred pounds of cold water, and then stir the sago-flour into said water, together with the carbolic acid.

I heat the mixture, as rapidly as possible, to the boiling-point, adding the soaked glue to it as soon as the heat has risen sufficiently to keep the sago-flour suspended in the water.

When the mixture arrives at the boiling-point, I boil it for thirty minutes, (more or less, as found expedient,) and then stir into it the *aqua ammonia.*

I permit the composite sizing thus produced to cool, in which condition it may be kept for use.

When it is to be combined with the paper, I dissolve two pounds of the sizing in three quarts of water, by the aid of heat; heating the mixture, for this purpose, to the boiling-point.

I keep the solution hot, say, at a temperature of about 125° of Fahrenheit, or more, and pass the paper through it in the same manner and by the same means as are employed by paper-makers in the operation of what is called "tub-sizing."

The paper, so treated, is subsequently dried and finished in the same manner as when sized with the ordinary animal sizing.

The two essential elements of my composite sizing are the sago-flour, or some equivalent starch-material, and the nitric acid, or some equivalent which produces substantially the same effect as that acid does upon starch; the useful effect of that acid in the preparation of my composite sizing being the rendering of it liquid, so that it can be freely applied to the paper, notwithstanding the comparatively small quantity of water used in its preparation.

The effect of the ammonia is to neutralize any free acid that may exisist in the mixture, and it may be omitted if this result is not required.

The effect of the carbolic acid is to preserve the composite sizing from spoiling in case it be kept before using. If the article is to be used immediately, the carbolic acid is not required, and in such case the sizing may be diluted with hot water as soon as it has been sufficiently boiled, and used immediately.

In practice, I find it convenient to heat the mixture of materials, and boil it by the use of a steam-pipe.

The heating and boiling may, however, be conveniently effected in any other competent manner, as, for example, by introducing steam directly into the mixture; but in this latter case, the quantity of cold water used should be reduced as the condensed steam unites with the mixture, the reduction being equal, or thereabout, to the water derived from the condensation of the steam.

In practice, I propose to vary the proportions of the ingredients as circumstances render expedient. For example, a composite sizing, sufficiently good for sizing second-class papers, may be produced, by omitting the glue, and substituting an equal weight of sago-flour in its places.

I also propose to use equivalent materials for the sago-flour, if found expedient. Thus, for example, potato-starch may be substituted for the sago-flour; but in this case I find it necessary, first, to dissolve such starch in the smallest quantity practicable, of water, by the aid of heat; then to dry the article at a temperature of about 140° of Fahrenheit, so as to produce an article resembling, in its qualities, pearl sago; and lastly, to grind the dried article to powder. The starch-flour, thus prepared, may be substituted for the sago-flour.

What I claim as my invention, and desire to secure by Letters Patent, is—

The composite sizing for paper, hereinbefore described, containing starch-material and nitric acid, as constituent ingredients.

Also, the combination of the said composite sizing (containing starch-material and nitric acid, as constituent ingredients,) and paper, as described, the whole constituting a new article of sized paper.

In testimony whereof, I have hereto set my hand, this 20th day of February, A. D. 1869.

ZENAS C. WARREN.

Witnesses:
H. C. HULBERT,
WM. C. WITTER.